(12) United States Patent
Graus

(10) Patent No.: US 12,097,913 B2
(45) Date of Patent: Sep. 24, 2024

(54) VEHICLE STEERING SYSTEMS AND METHODS

(71) Applicant: Polaris Industries Inc., Medina, MN (US)

(72) Inventor: Jonathon P. Graus, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 275 days.

(21) Appl. No.: 17/410,781

(22) Filed: Aug. 24, 2021

(65) Prior Publication Data

US 2022/0063714 A1    Mar. 3, 2022

Related U.S. Application Data

(60) Provisional application No. 63/071,855, filed on Aug. 28, 2020.

(51) Int. Cl.
*B62D 5/04*      (2006.01)

(52) U.S. Cl.
CPC ......... *B62D 5/0472* (2013.01); *B62D 5/0409* (2013.01); *B62D 5/0481* (2013.01)

(58) Field of Classification Search
CPC ... B62D 5/0472; B62D 5/0409; B62D 5/0481
See application file for complete search history.

(56) References Cited

U.S. PATENT DOCUMENTS

| | | | |
|---|---|---|---|
| 4,909,527 A | 3/1990 | Hosotani | |
| 6,942,058 B2 | 9/2005 | Turner | |
| 8,818,633 B2 | 8/2014 | Ebihara | |
| 2011/0024224 A1 | 2/2011 | Mori et al. | |
| 2012/0061169 A1 | 3/2012 | Oblizajek et al. | |
| 2014/0297122 A1 | 10/2014 | Kouchi | |
| 2015/0203148 A1* | 7/2015 | Kuramitsu | G06F 17/11 701/41 |
| 2016/0251028 A1* | 9/2016 | Tsubaki | B62D 5/0463 701/42 |
| 2017/0355396 A1* | 12/2017 | Varunjikar | B62D 6/002 |
| 2019/0276074 A1* | 9/2019 | Tietz | B62D 5/006 |
| 2020/0114952 A1 | 4/2020 | Mayer et al. | |
| 2022/0227414 A1* | 7/2022 | Jeong | B62D 5/0463 |

FOREIGN PATENT DOCUMENTS

| | | |
|---|---|---|
| CN | 101987633 A | 3/2011 |
| CN | 102407879 A | 4/2012 |
| CN | 105517877 A | 4/2016 |
| CN | 111038577 A | 4/2020 |
| JP | H07228263 | 8/1995 |
| JP | 10-194152 A | 7/1998 |
| JP | 2009-248937 A | 10/2009 |
| KR | 101188586 | 6/2009 |

* cited by examiner

*Primary Examiner* — Tony H Winner

(74) *Attorney, Agent, or Firm* — Faegre Drinker Biddle & Reath LLP

(57) ABSTRACT

A power steering system reduces or prevents an unintended jerking of a steering input device due to an unintended torque being input into the power steering system from an output of the power steering system. The unintended torque may be determined based on an acceleration of a motor of the power steering system.

23 Claims, 16 Drawing Sheets

VEHICLE STEERING SYSTEMS AND METHODS

FIELD OF THE DISCLOSURE

The present disclosure relates to steering systems and methods and in particular to steering systems and methods to reduce kickback experience at the steering input.

BACKGROUND OF THE DISCLOSURE

Recreational vehicles are often traversing terrain that has not been graded or otherwise prepared as a smooth travel surface. As such, recreational vehicles may encounter obstacles that can contact either a left side steering ground engaging member or a right side steering ground engaging member. Depending on the obstacle size this contact may cause movement of the ground engaging member both upwards and to one of the left or right. This movement to the left or right, if transmitted back to the steering input of the vehicle, such as a steering wheel, can cause a sudden and unexpected jerk of the steering input. This sudden or unexpected jerk of the steering input is known as kickback.

SUMMARY OF THE DISCLOSURE

In an exemplary embodiment of the present disclosure, a vehicle is provided. The vehicle comprising a plurality of ground engaging members; a frame supported by the plurality of ground engaging members; at least one seat; a powertrain operatively coupled to at least a portion of the plurality of ground engaging members to in use propel the vehicle; and a steering system operatively coupled to at least a first ground engaging member and a second ground engaging member of the plurality of ground engaging members to steer the vehicle. The steering system including an operator steering input device; a steering input shaft operatively coupled to the operator steering input device; a power steering assembly including a motor, a gearset operatively coupled to the motor, and a motor control circuit operatively coupled to the motor; a steering output shaft operatively coupled to the steering input shaft through the power steering assembly and to the gearset of the power steering assembly; a first tie rod operatively coupling the steering output shaft to the first ground engaging member; a second tie rod operatively coupling the steering output shaft to the second ground engaging member; and at least one sensor to provide an indication of an acceleration of the motor of the power steering assembly, the motor control circuit adjusting a characteristic of the motor to reduce a transmission to the operator steering input device of an unintended torque steering input from one of the first ground engaging member and the second ground engaging member.

In an example thereof, the characteristic of the motor is a current of the motor.

In another example thereof, the at least one sensor is a motor angular velocity sensor. In a variation thereof, the motor angular velocity sensor monitors an angular velocity of an output shaft of the motor. In a further variation thereof, the motor control circuit adjusts the characteristic of the motor to reduce the transmission to the operator steering input device of the unintended torque steering input from one of the first ground engaging member and the second ground engaging member when the acceleration of the motor of the power steering system is increasing the motor angular velocity of the motor. In still a further variation thereof, the motor control circuit adjusts the characteristic of the motor to reduce the transmission to the operator steering input device of the unintended torque steering input from one of the first ground engaging member and the second ground engaging member when the motor angular acceleration exceeds a first threshold. In yet still a further variation thereof, the motor control circuit determines a motor angular acceleration of the motor of the power steering assembly based on the indication of the acceleration of the motor of the power steering assembly and only adjusts the characteristic of the motor when both the motor angular acceleration exceeds a first threshold and the acceleration of the motor of the power steering system is increasing the motor angular velocity of the motor.

In another exemplary embodiment of the present disclosure, a power steering system for a vehicle is provided. The power steering system being coupled to a steering input shaft in use operatively coupled to an operator steering input device and a steering output shaft in use operatively coupled to at least one ground engaging member. The power steering system comprising a motor, a gearset operatively coupled to the motor and in use operatively coupled to the steering output shaft; a motor control circuit operatively coupled to the motor; and at least one sensor in use to provide an indication of an acceleration of the motor, the motor control circuit adjusting a characteristic of the motor to reduce a transmission to the operator steering input device of an unintended torque input into the steering output shaft from the at least one ground engaging member.

In an example thereof, the characteristic of the motor is a current of the motor.

In another example thereof, the at least one sensor is a motor angular velocity sensor. In a variation thereof, the motor angular velocity sensor monitors an angular velocity of an output shaft of the motor. In a further variation thereof, the motor control circuit determines a motor angular acceleration of the motor of the power steering assembly based on the indication of the acceleration of the motor of the power steering assembly and adjusts the characteristic of the motor to reduce the transmission to the operator steering input device of the unintended torque input into the steering output shaft from the at least one ground engaging member when the acceleration of the motor is increasing the motor angular velocity of the motor. In still a further variation thereof, the motor control circuit determines a motor angular acceleration of the motor of the power steering assembly based on the indication of the acceleration of the motor of the power steering assembly and adjusts the characteristic of the motor to reduce the transmission to the operator steering input device of the unintended torque steering input from one of the first ground engaging member and the second ground engaging member when the motor angular acceleration exceeds a first threshold. In a further still variation thereof, the motor control circuit determines a motor angular acceleration of the motor of the power steering assembly based on the indication of the acceleration of the motor of the power steering assembly and only adjusts the characteristic of the motor to reduce the transmission to the operator steering input device of the unintended torque steering input from one of the first ground engaging member and the second ground engaging member when both the motor angular acceleration exceeds a first threshold and the acceleration of the motor is increasing the motor angular velocity of the motor.

In a further exemplary embodiment of the present disclosure, a method of reducing kickback at an operator steering input of a vehicle from a power steering assembly due to an unintended torque input into a steering output shaft coupled to the power steering assembly from one of a first ground engaging member of the vehicle and a second ground engaging member of the vehicle, the first ground engaging member of the vehicle and the second ground engaging member of the vehicle being operatively coupled to the steering output shaft is provided. The method comprising the steps of monitoring at least one characteristic of the steering assembly; classifying a received steering input as one of a normal operation and a potential kickback based on a character of the received steering input on the monitored at least one characteristic; and when the received steering input is classified as the potential kickback, adjusting a characteristic of a motor of the power steering system to counteract the received steering input.

In an example thereof, the at least one characteristic of the steering assembly is between a torque sensor of the power steering assembly monitoring a twist angle of the a torque shaft of the power steering assembly and the first ground engaging member. In a variation thereof, the at least one characteristic includes an angular acceleration of the motor of the power steering assembly. In a further variation thereof, the step of classifying the received steering input as one of the normal operation and the potential kickback based on the character of the received steering input includes the steps of comparing a magnitude of the angular acceleration of the motor of the power steering assembly to a first threshold; and classifying the received steering input as a potential kickback when the magnitude of the angular acceleration of the motor of the power steering assembly exceeds the first threshold.

In another example thereof, the at least one characteristic of the steering assembly includes a first characteristic of a motor of the power steering assembly and a second characteristic of the power steering assembly. In a variation thereof, the first characteristic of the motor of the power steering assembly is an indication of an angular velocity of a motor shaft of the motor of the power steering assembly and the second characteristic an indication of an angular acceleration of the motor shaft of the motor of the power steering assembly. In another variation thereof, the step of adjusting the characteristic of the motor of the power steering system to counteract the received steering input includes the step of applying a current to the motor to counteract the received steering input, a magnitude of the current being based on both the indication of the angular velocity of the motor shaft of the motor of the power steering assembly and the indication of the angular acceleration of the motor shaft of the motor of the power steering assembly.

In still another exemplary embodiment of the present disclosure, a vehicle is provided. The vehicle comprising a plurality of ground engaging members; a frame supported by the plurality of ground engaging members; at least one seat; a powertrain operatively coupled to at least a portion of the plurality of ground engaging members to in use propel the vehicle; and a steering system operatively coupled to at least a first ground engaging member and a second ground engaging member of the plurality of ground engaging members to steer the vehicle. The steering system including an operator steering input device; a steering input shaft operatively coupled to the operator steering input device; a power steering assembly including a motor, a gearset operatively coupled to the motor, and a motor control circuit operatively coupled to the motor; a steering output shaft operatively coupled to the steering input shaft through the power steering assembly and to the gearset of the power steering assembly; a torque sensor monitoring a torque between the steering input shaft and the steering output shaft; a first tie rod operatively coupling the steering output shaft to the first ground engaging member; a second tie rod operatively coupling the steering output shaft to the second ground engaging member; and at least one sensor to provide an indication of at least two characteristics of the steering system downstream of the torque sensor, the motor control circuit adjusting a characteristic of the motor to reduce a transmission to the operator steering input device of an unintended torque steering input from one of the first ground engaging member and the second ground engaging member.

In an example thereof, a first characteristic of the at least two characteristics of the steering system downstream of the torque sensor is a strain of the first tie rod.

In another example thereof, a first characteristic of the at least two characteristics of the steering system downstream of the torque sensor is one of a first strain of the first tie rod and a second strain of the second tie rod.

In a further example thereof, a first characteristic of the at least two characteristics of the steering system downstream of the torque sensor is an angular velocity of the motor of the power steering system. In a variation thereof, a second characteristic of the at least two characteristics of the steering system downstream of the torque sensor is an angular acceleration of the motor of the power steering system.

In still a further variation thereof, a first characteristic of the at least two characteristics of the steering system downstream of the torque sensor is an angular acceleration of the motor of the power steering system.

In a yet still further exemplary embodiment of the present disclosure, a method of reducing kickback at an operator steering input of a vehicle from a power steering assembly due to an unintended torque input into a steering output shaft coupled to the power steering assembly from one of a first ground engaging member of the vehicle and a second ground engaging member of the vehicle, the first ground engaging member of the vehicle and the second ground engaging member of the vehicle being operatively coupled to the steering output shaft is provided. The method comprising the steps of monitoring at least two characteristics of the steering assembly including a torque exhibited between a steering input shaft operatively coupled to the operator steering input device and the steering output shaft; determining, independent of the torque exhibited between the steering input shaft operatively coupled to the operator steering input device and the steering output shaft, if the unintended torque input into the steering output shaft coupled to the power steering assembly from one of the first ground engaging member of the vehicle and the second ground engaging member of the vehicle is a potential kickback; and counteracting the potential kickback to reduce a transmission to the operator steering input device of the unintended torque input into the steering output shaft from one of a first ground engaging member of the vehicle and a second ground engaging member of the vehicle.

The above mentioned and other features of the disclosure, and the manner of attaining them, will become more apparent and will be better understood by reference to the following description of embodiments taken in conjunction with the accompanying drawings. These above mentioned and other features may be used in any combination or permutation.

BRIEF DESCRIPTION OF THE DRAWINGS

Corresponding reference characters indicate corresponding parts throughout the several views.

DETAILED DESCRIPTION OF THE DRAWINGS

Figure 1:
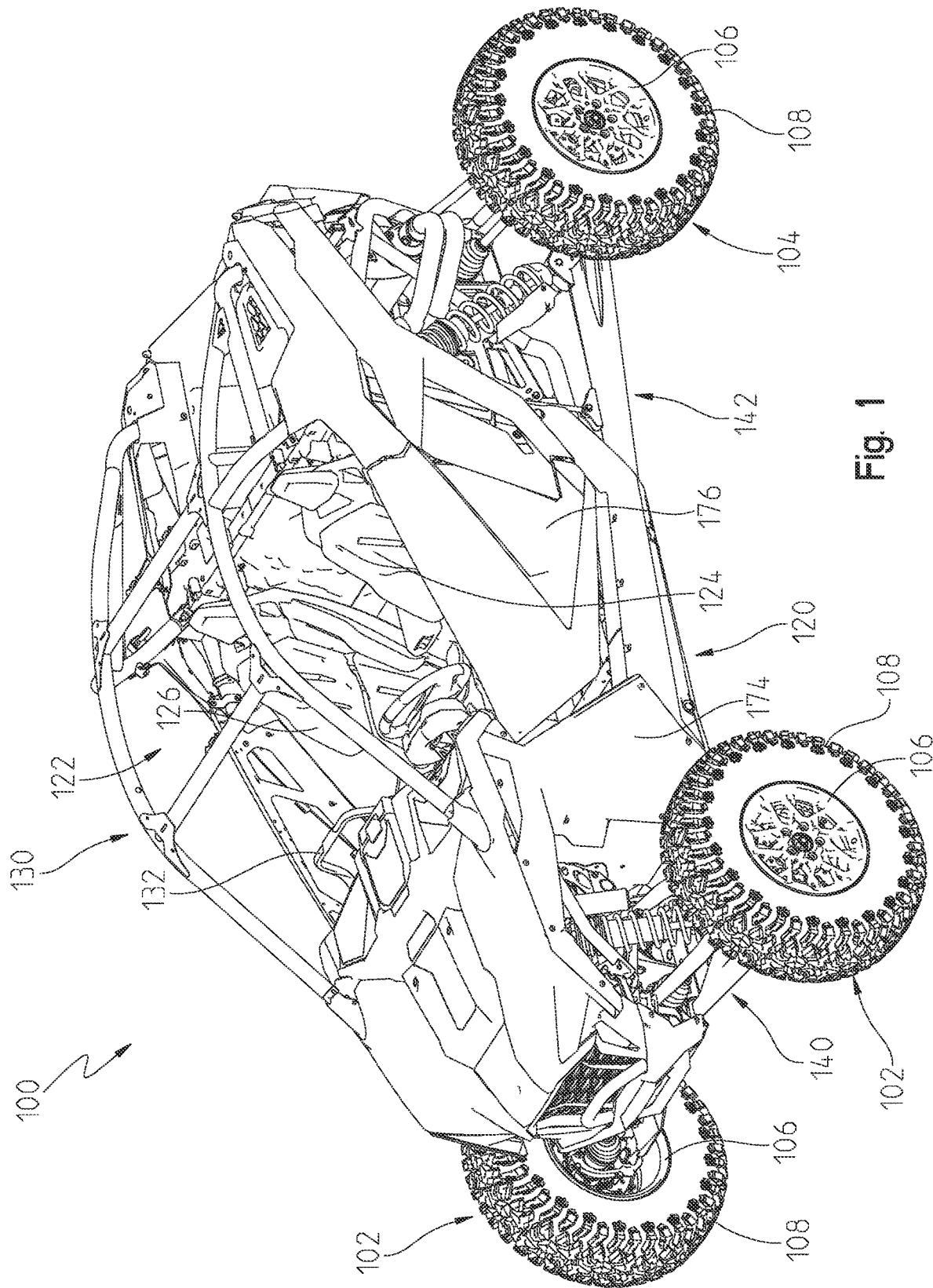
FIG. 1 is a front left perspective view of the vehicle of the present invention.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side vehicle, it should be understood that the features disclosed herein may have application to other types of vehicles such as all-terrain vehicles, snowmobiles, and golf carts.

With reference first to FIGS. 1-7, a side-by-side recreational vehicle 100 is shown. Vehicle 100 includes a plurality of ground engaging members, illustratively front wheels 102 and rear wheels 104. Wheels 102 and 104 are comprised of rims 106 and tires 108. Wheels 102 and 104 support a vehicle frame 120 which in turn supports a seating area 122 comprised of a driver's seat 124 and a passenger seat 126. A cab frame 130 extends over seating area 122 to protect the passengers from such objects as tree branches, etc. A passenger grab bar 132 is provided for the passenger in seat 126.

Vehicle 100 further includes a front suspension at 140, which in the present disclosure is a double A-arm suspension and further includes a rear suspension 142, which as shown in the present disclosure is a trailing arm-type suspension. Vehicle 100 includes a powertrain including a prime mover and drive system. Exemplary prime movers include internal combustion engine, electric motor, and combinations of both. Referring to FIG. 3, an exemplary prime mover, illustratively engine 150 is shown. The drive system includes a continuously variable transmission (CVT) 152 and a shiftable transmission 154 which is operated by a shifter assembly 156 (see FIG. 5). In embodiments, vehicle 100 is a four-wheel drive vehicle including a front final drive 158 (see FIG. 2) having front stub shafts 160 coupled to the front final drive 158 for driving the front wheels 102. A rear final drive 162 (see FIG. 2) is provided to drive half shafts 164 which drives rear wheels 104. As shown vehicle 100 may also include an outer body 170 including a hood 172, side panels 174, doors 176, a utility bed 178 and rear panels 180. Vehicle 100, as described herein, may be further configured as shown in U.S. Pat. No. 8,827,028; U.S. patent application Ser. No. 16/458,797, published as US20200164742A1; U.S. patent application Ser. No. 16/244,462, published as US20190210668A1; and/or U.S. patent application Ser. No. 16/861,859, the entire disclosures of which are expressly incorporated by reference herein.

Further the steering system described herein can be used with additional vehicle types includes snowmobiles, straddle seat ATVs, three wheel motorcycles, and other suitable types of vehicles. Exemplary vehicles are disclosed in U.S. Pat. Nos. 10,569,819; 9,004,214; U.S. patent application Ser. No. 16/723,182; and U.S. Patent Application No. 63/027,833, the entire disclosures of which are expressly incorporated by reference herein.

Figure 2:
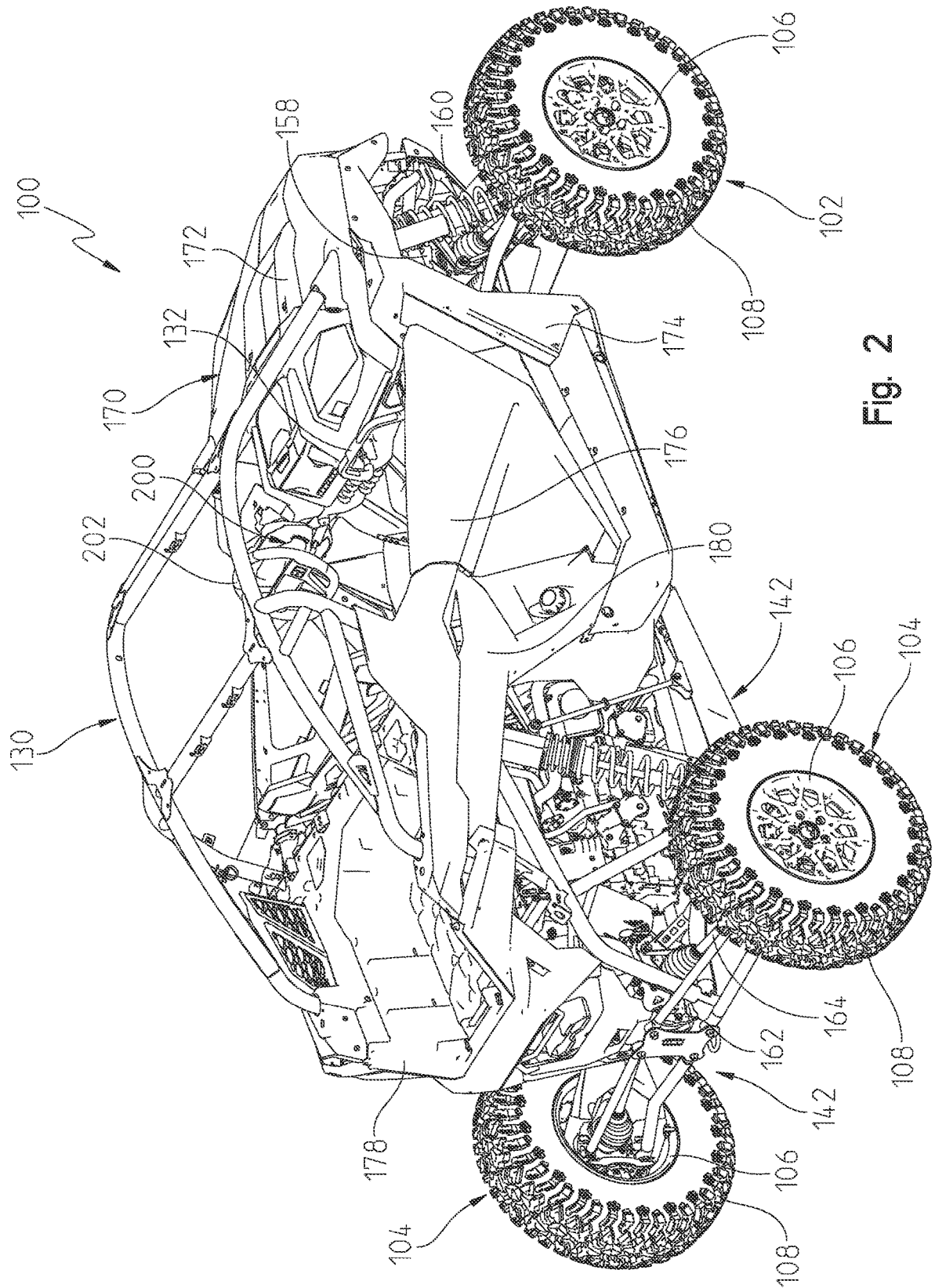
FIG. 2 is a right rear perspective view of the vehicle of FIG. 1.
Figure 3:
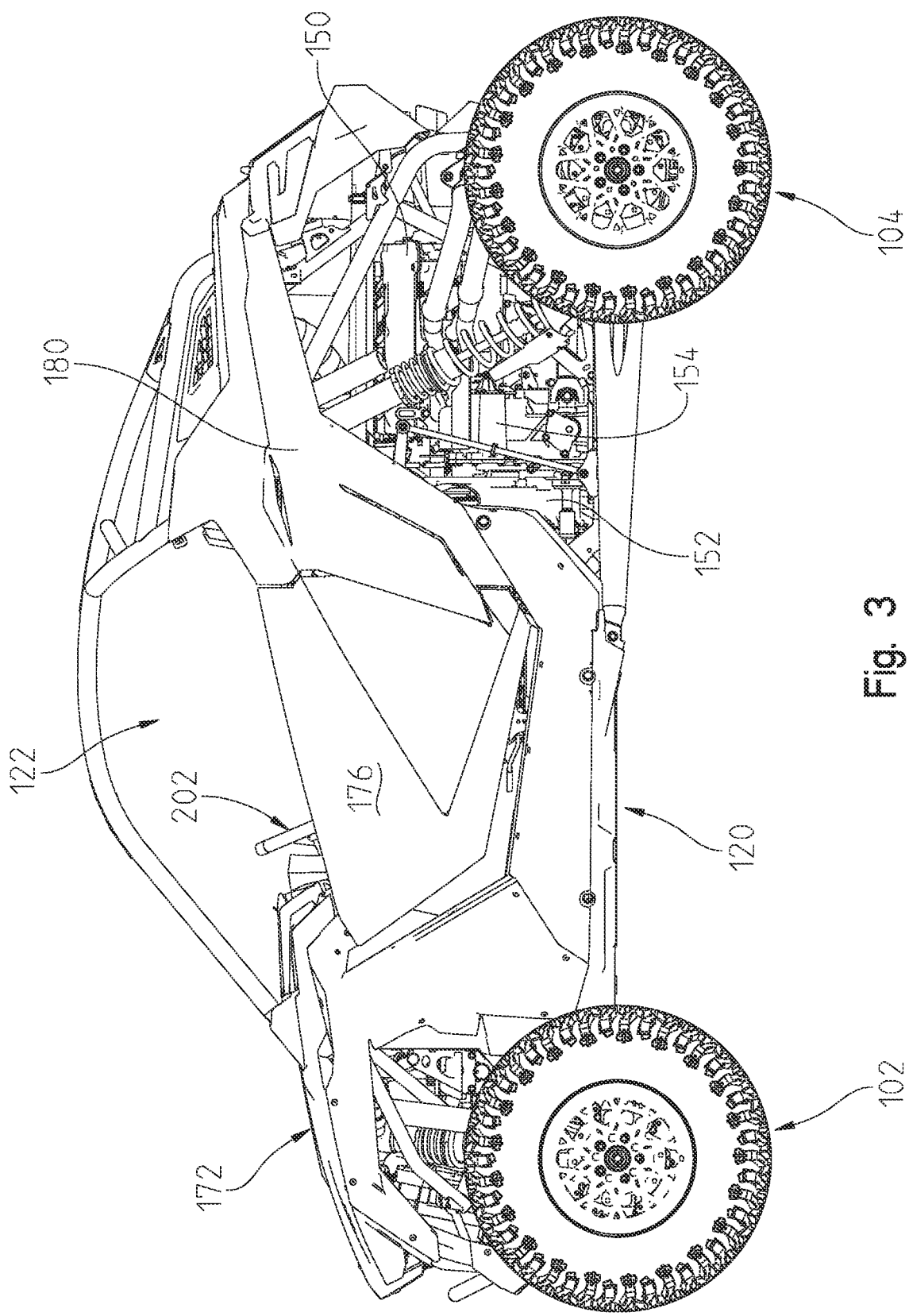
FIG. 3 is a left side view of the vehicle of FIG. 1.
Figure 4:
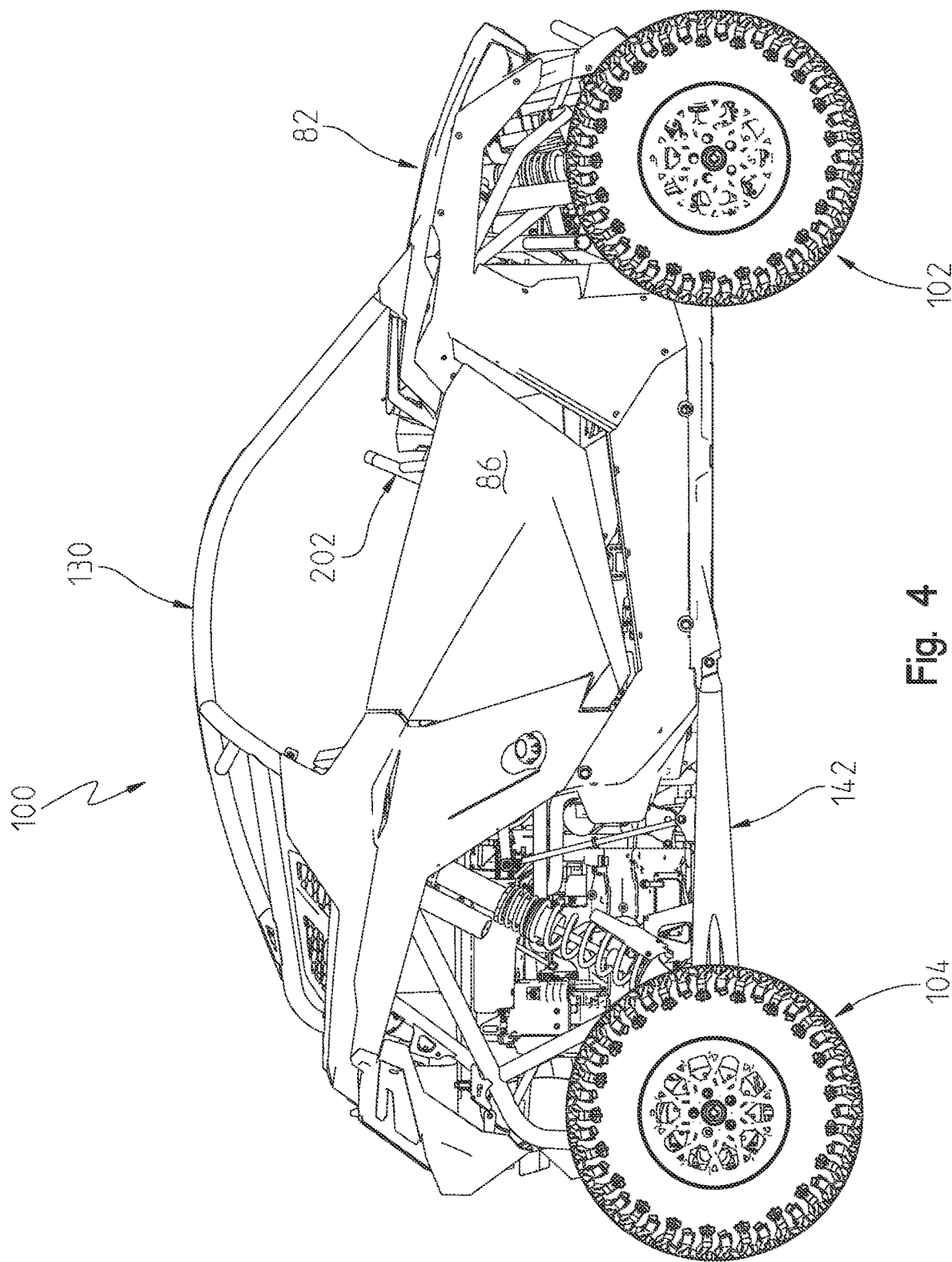
FIG. 4 is a right side view of the vehicle of FIG. 1.
Figure 5:
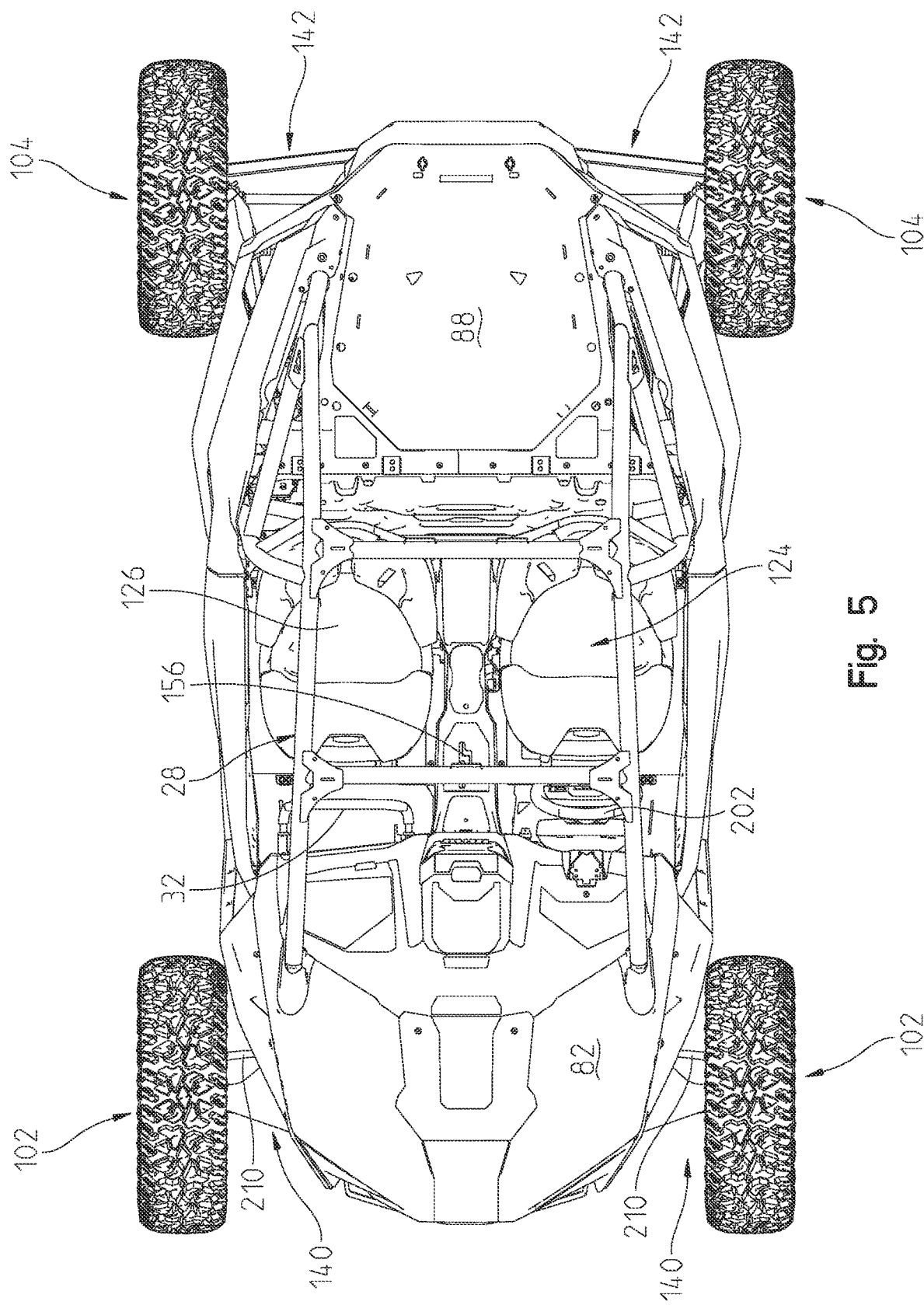
FIG. 5 is a top view of the vehicle of FIG. 1.
Figure 6:
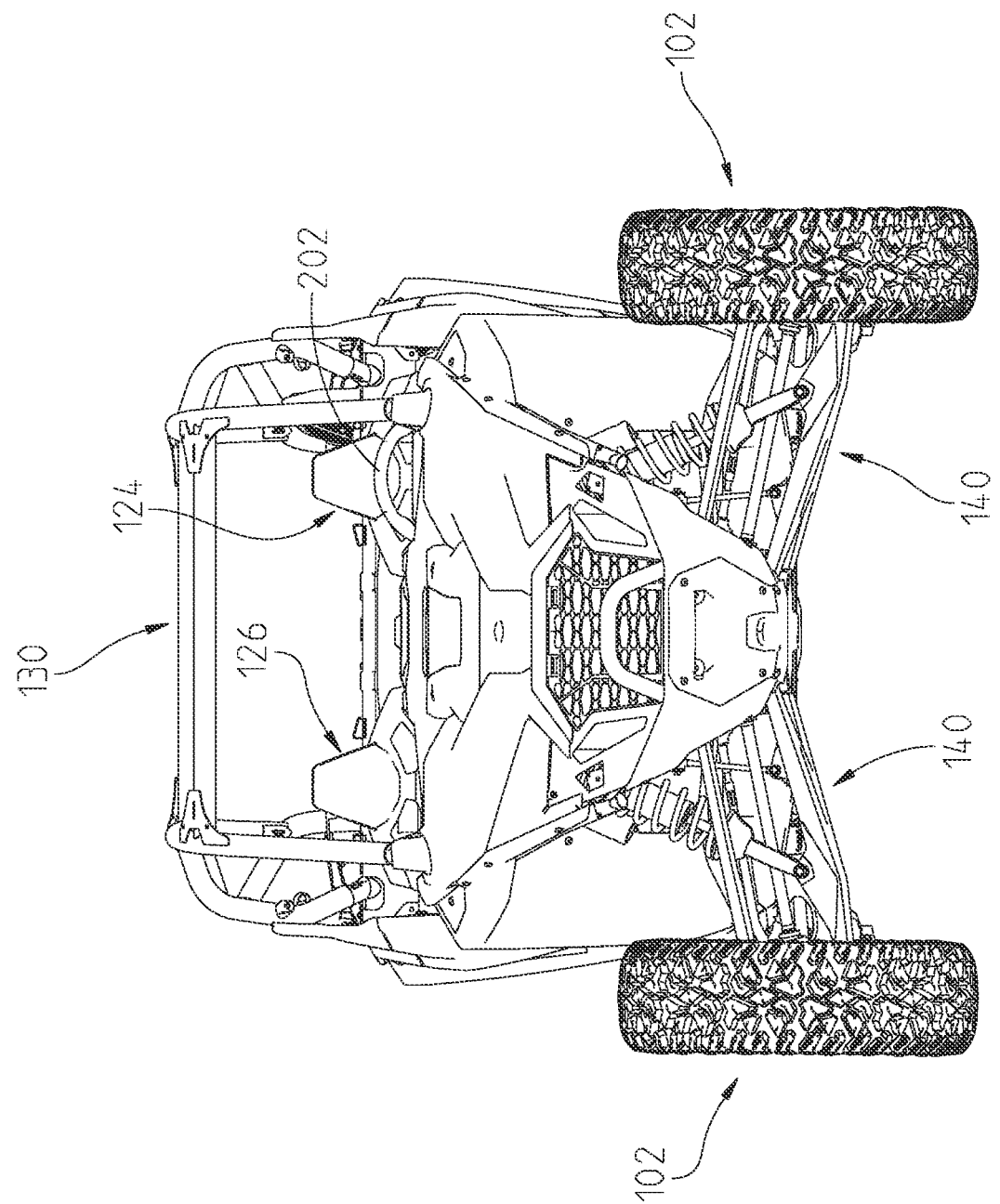
FIG. 6 is a front view of the vehicle of FIG. 1.
Figure 7:
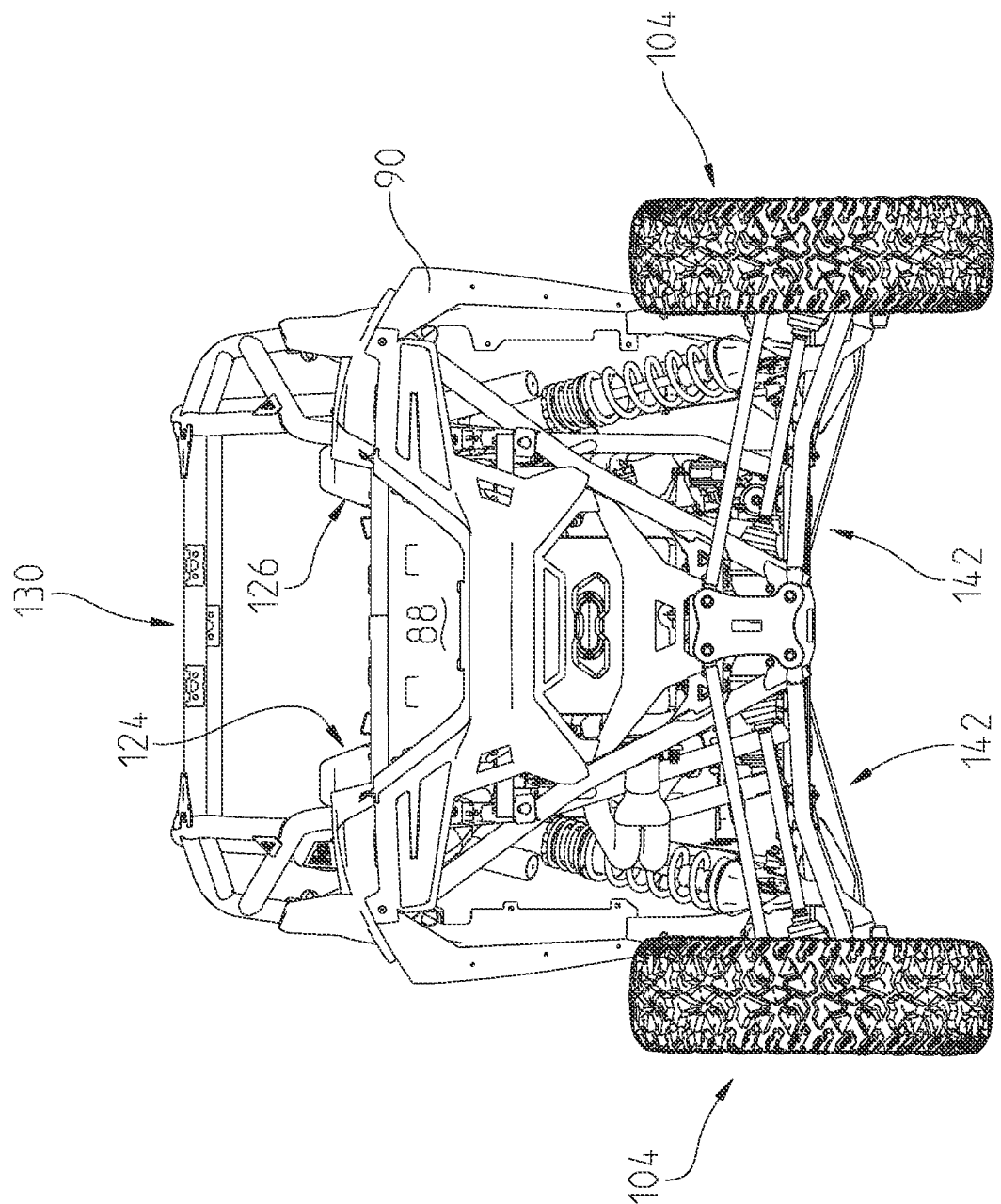
FIG. 7 is a rear view of the vehicle of FIG. 1.
Figure 8:
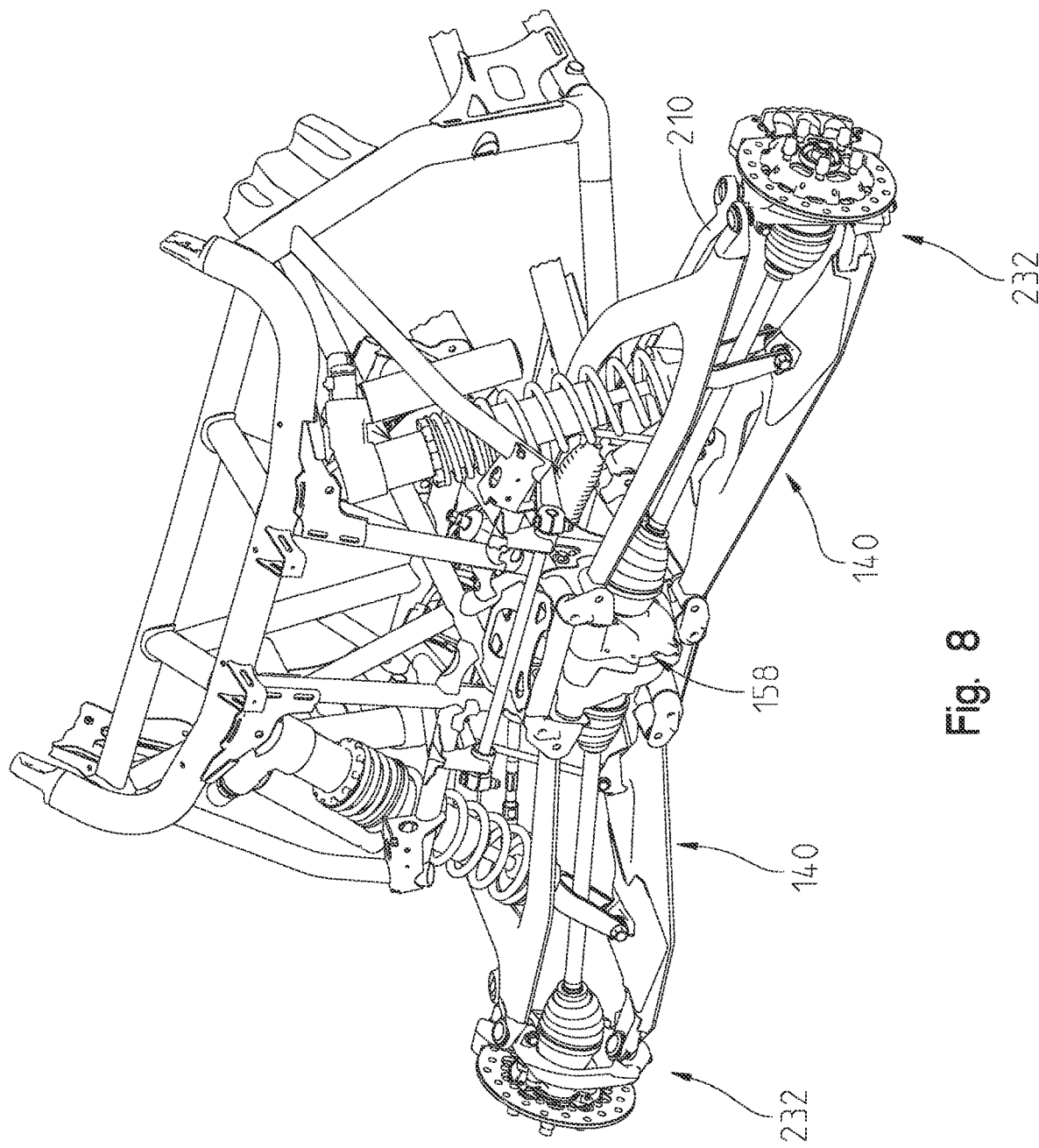
FIG. 8 is a front left perspective view of the front suspension of the vehicle of FIG. 1.

As best shown in FIG. 2, vehicle 100 further includes a steering assembly 200 including a steering input, illustratively a steering wheel 202. Steering wheel 202 may be both tiltable and longitudinally movable as described in U.S. Provisional Patent Application Ser. No. 62/615,684 filed Jan. 10, 2018, the disclosure of which is expressly incorporated by reference herein. Steering wheel 202 may be rotated by a driver of vehicle 100 and used to alter a direction of the front wheels 102.

Figure 9:
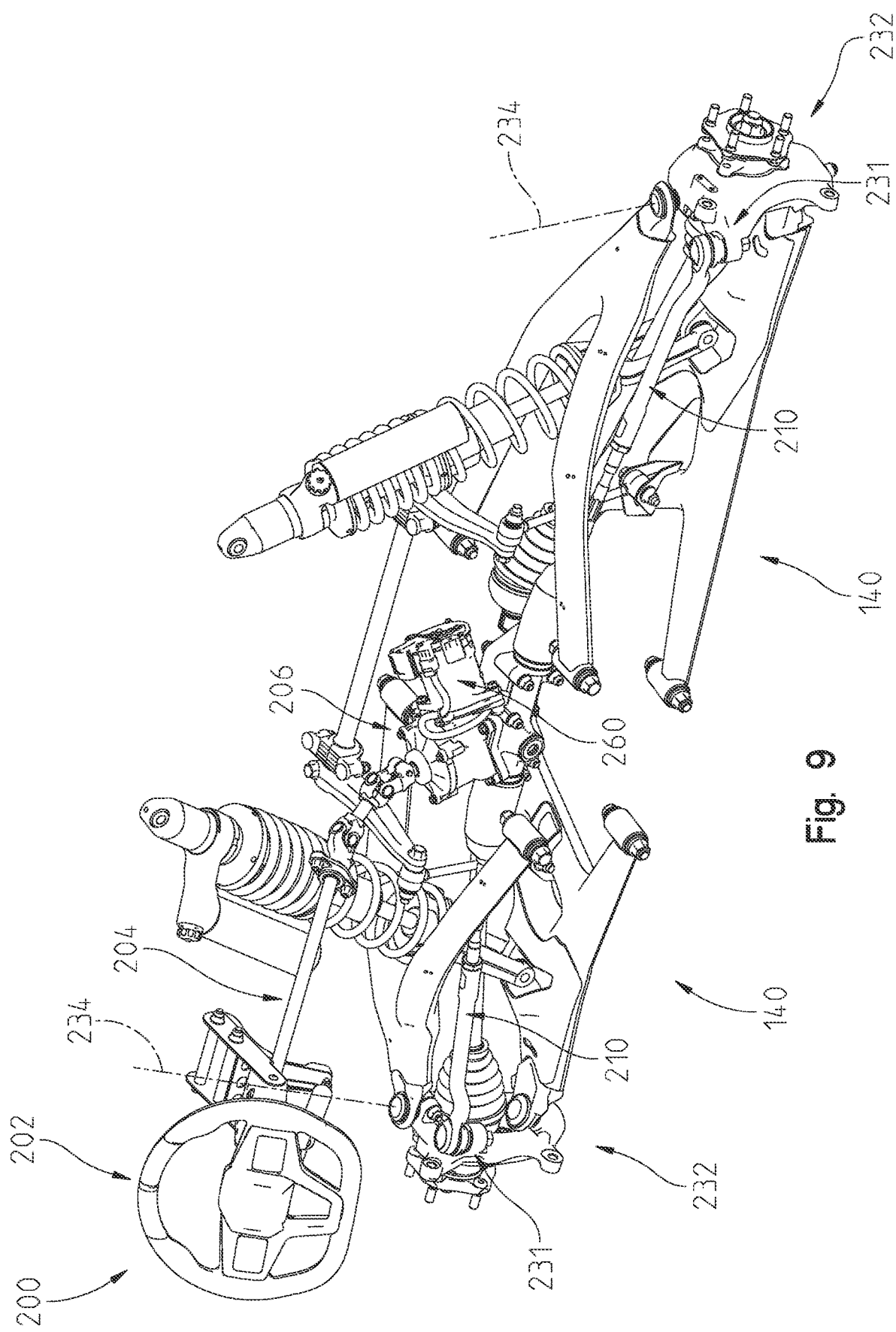
FIG. 9 is a rear right perspective view of the steering assembly and portions of the front suspension of FIG. 8 of the vehicle of FIG. 1.
Figure 10:
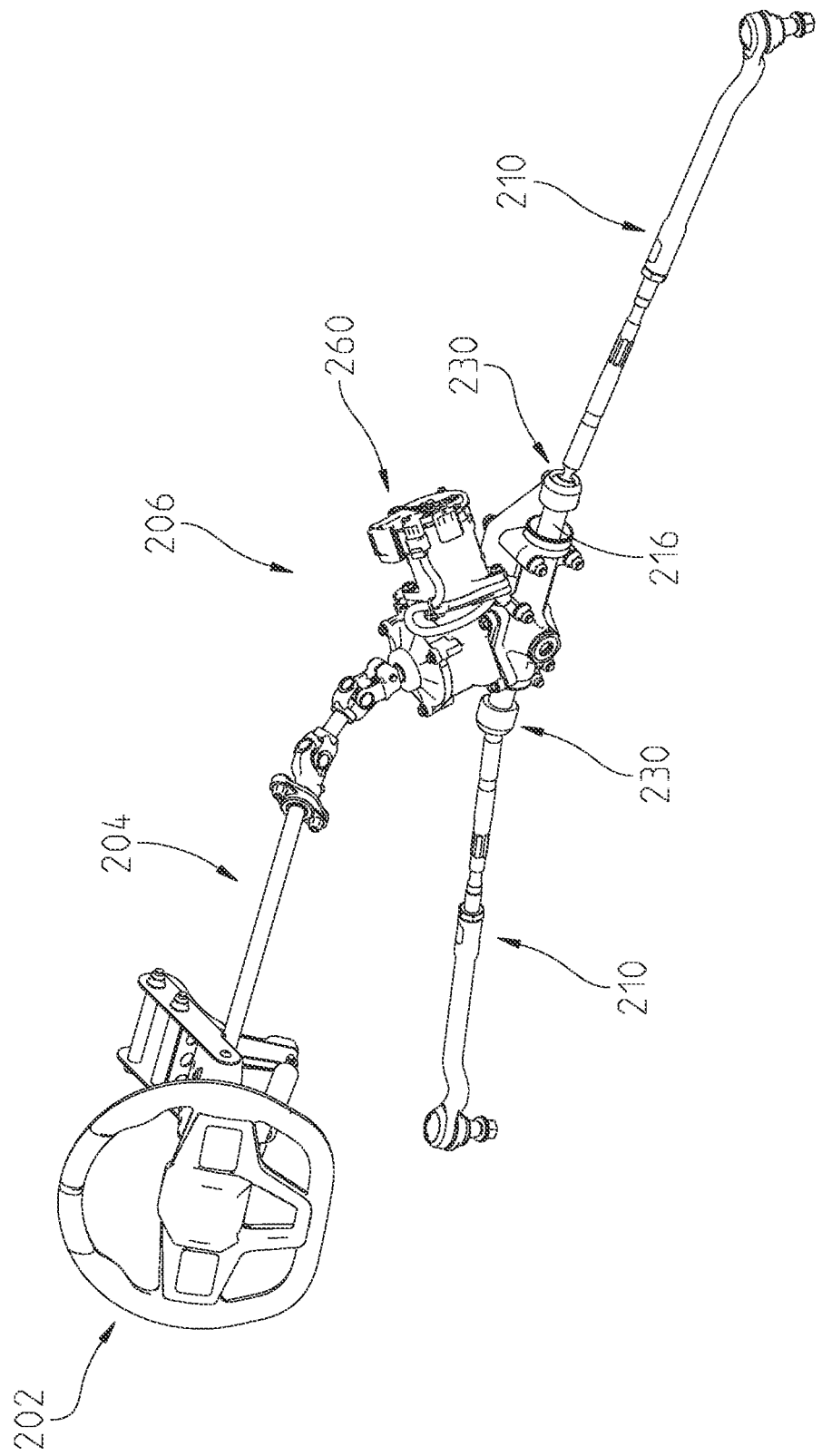
FIG. 10 is a rear right perspective view of portions of the steering assembly of FIG. 9 of the vehicle of FIG. 1.
Figure 11:
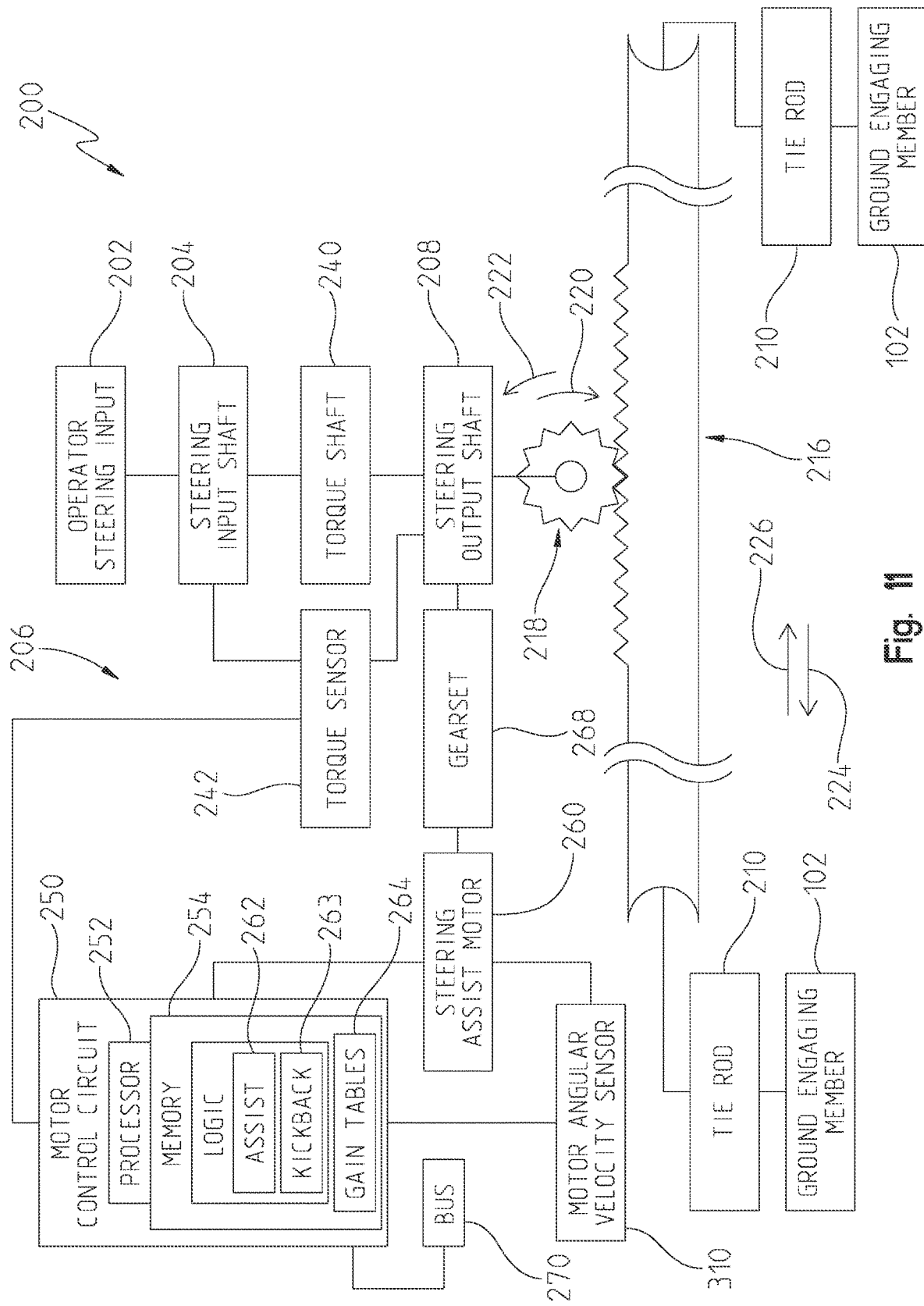
FIG. 11 is a representational view of portions of the steering assembly of the vehicle of FIG. 1.

Referring to FIG. 10, steering wheel 202 is coupled to a steering input shaft 204 which is in turn coupled to an electronic power steering unit 206. Electronic power steering unit 206 is coupled to a steering output shaft 208 (see FIG. 11) which in turn is coupled to a pair of steering arms 210 through a steering assembly 212. Referring to FIG. 11, steering system 212 includes a rack 216 and pinion 218. The steering output shaft 208 is coupled to pinion 218 to rotate pinion 218 in either direction 220 resulting in a movement of rack 216 in direction 224 or in direction 222 resulting in a movement of rack 216 in direction 226. Tie rods 210 are coupled to respective ends of rack 216 through couplers 230. Tie rods 210 are further coupled to respective steering arm portions 231 (see FIG. 9) of wheel carriers 232 of front wheels 102. Based on the position of tie rods 210, the respective wheel carriers 232 are rotated about their respective axes 234 to turn vehicle 10 to the left or to the right or to continue moving in a straight direction.

Returning to FIGS. 11 and 12, electronic power steering unit 206 includes a torque shaft 240 which couples steering input shaft 204 and steering output shaft 208. Torque shaft 240 is able to twist about its axis 244 up to a first angle in response to an input of torque either from steering input shaft 204 or steering output shaft 208. If torque shaft 240 is twisted up to the first angle then torque shaft 240 acts as a solid connection between steering input shaft 204 and steering output shaft 208 and transmits additional torque therebetween.

Torque sensor 242 monitors this torque load of torque shaft 240 and provides an indication thereof to a motor control circuit 250 of electronic power steering unit 206. Torque sensor 242 monitors the torque load of torque shaft 240 by being mechanically attached to steering input shaft 204 and steering output shaft 208 to measure a twist angle between the steering input shaft 204 and steering output shaft 208. The twist angle is converted to a torque value using the known stiffness of the torque shaft. In the illustrated embodiment, motor control circuit 250 is microprocessor-based, processor 252, and includes a non-transitory computer readable medium 254 which includes processing instructions stored therein that are executable by processor 252 of motor control circuit 250 to control operation of a steering assist motor 260 of electronic power steering unit 206. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 12:
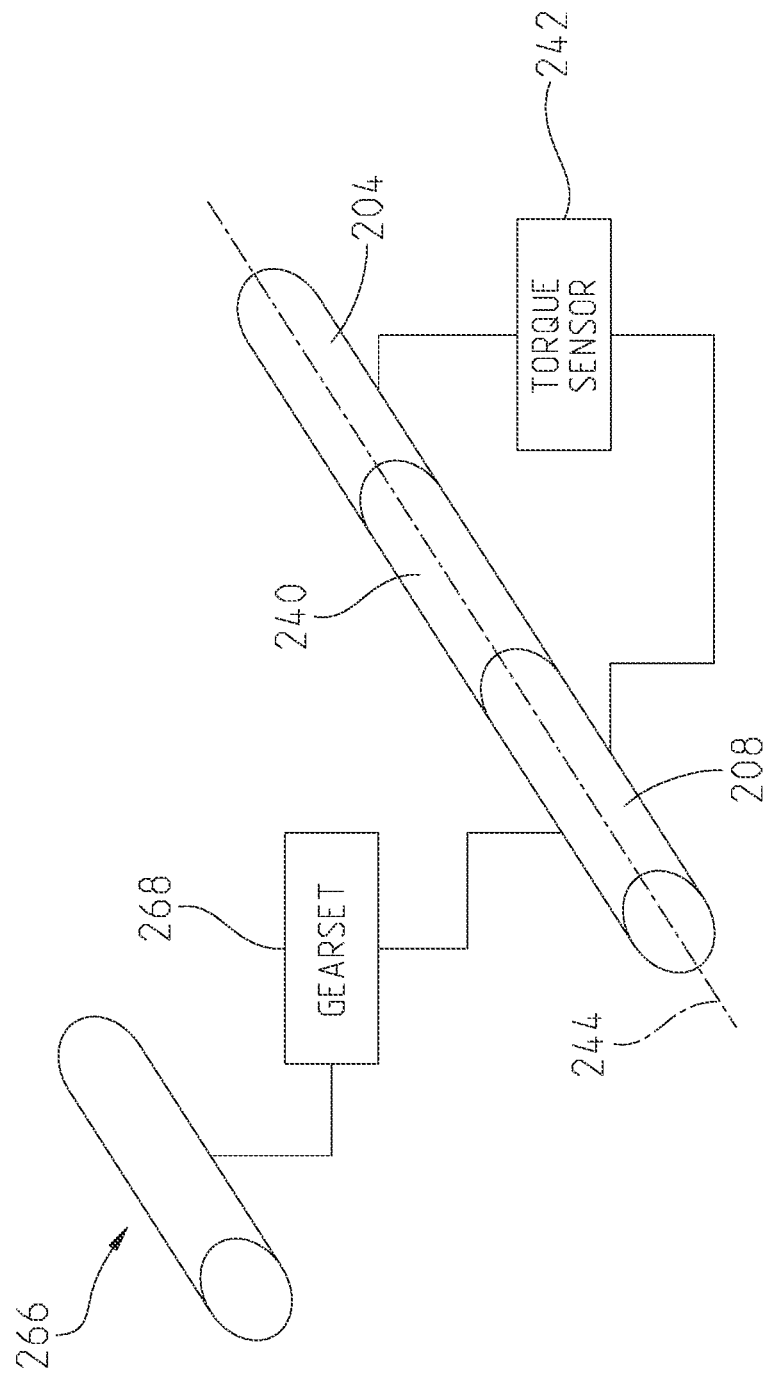
FIG. 12 is a representational view of portions of the steering assembly of the vehicle of FIG. 1.

In embodiments, motor control circuit 250 executes a steer assist logic 262 which provides control signals to steering assist motor 260 to impart a rotation of steering output shaft 208 in a direction to reduce the torque induced twist on torque shaft 240 by the rotation of steering input shaft 204 and reduce the effort required at the steering input 202 to turn ground engaging members 102. As shown in FIGS. 11 and 12, an output shaft 266 of steering assist motor 260 is coupled to steering output shaft 208 through a gearset 268. For example, the output shaft 266 of steering assist motor 260 may be the worm of a worm drive to rotate a worm gear carried by steering output shaft 208. The amount of rotation of output shaft 266 may be controlled based on an indication of the amount of torque exerted on torque shaft 240 measured by torque sensor 242, a speed of vehicle 100 received by motor control circuit 250 over a bus 270 from other sensors or controllers of vehicle 100, a measured steering angle of steering wheel 202, other vehicle 100 parameters, or combinations thereof. An exemplary bus 270 is a CAN bus which communicatively couples various vehicle components together. Further, based on the inputs, steer assist logic 262 of motor control circuit 250 may set the amount of rotation of output shaft 266 based on one or more look-up tables 264 or formulas. Look-up tables 264 may provide a rotation value or factor based on one or more inputs, such as steering angle, measured torque, and/or vehicle speed, and based on additional inputs, such as a selected mode of operation of vehicle 100. Some vehicles include multiple modes, such as comfort, sport, firm, trail, race, rock, desert, novice, and different gain tables 264 are provided for each possible mode. Exemplary vehicle modes are described in U.S. patent application Ser. Nos. 16/013, 210, 15/816,368, and 16/198,280 the entire disclosures of which are expressly incorporated by reference herein.

In embodiments, motor control circuit 250 executes a kickback logic 263 which provides control signals to steering assist motor 260 to impart a rotation of steering output shaft 208 in a direction to reduce an unintended torque on torque shaft 240 by the rotation of steering output shaft 208 due to a movement of rack 216. In driving vehicle 100 over a terrain, one of front wheels 102 may encounter an obstacle, such as a rock or other obstacle. When the respective front wheels 102 strikes the obstacle, the front wheels 102 may be turned either to the left or right resulting in a movement of rack 216. This movement of rack 216, unless countered, will be transmitted to steering wheel 202 through electronic power steering unit 206 resulting in an undesired jerking of steering wheel 202. As explained herein, kickback logic 263 based on at least one or more characteristics of the steering system downstream of the torque sensor 242 controls steering assist motor 260 to counter the movement of rack 216 to reduce the jerking of steering wheel 202. The phrase "downstream of the torque sensor" means all portions of the steering system 200 from the torque sensor to the ground engaging members 102. The phrase "upstream of the torque sensor" means all portions of the steering system 200 from the torque sensor up to the steering input 202. An advantage, among others, of monitoring a downstream portion of the steering system 200 is that kickback logic 263 is able to react at an earlier moment in time than by monitoring the torque sensor 242. In the illustrated embodiment, the downstream portion is one or more characteristics of the steering assist motor 260.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which motor control circuit 250 is not microprocessor-based, but rather is configured to control operation of steering assist motor 260 based on one or more sets of hardwired instructions and/or software instructions stored in memory 254. Further, motor control circuit 250 may be contained within a single device or be a plurality of devices networked together to provide the functionality described herein. The sensors mentioned herein may either actively provide an indication by sending a sensor signal or passively provide an indication by making available a monitored characteristic, such as a voltage, a current, or other suitable characteristics.

In situations wherein torque is input into electronic power steering unit 206 upstream of the torque sensor 242 from steering input shaft 204 due to a rotation of steering wheel 202, the torque is referred to as "intended torque." Steer assist logic 262 functions to aid in the transmission of the intended torque being transmitted through electronic power steering unit 206 to rack 216. In situations wherein torque is input into electronic power steering unit 206 downstream of the torque sensor 242 from steering output shaft 208 due to one of the ground engaging members 102 striking an obstacle, the torque is referred to as "unintended torque." Further, when the unintended torque has a character indicating it can cause kickback at the operator steering input 202 such an unintended torque is referred to as "kickback unintended torque". Kickback logic 263 functions to reduce or cancel kickback unintended torque from being transmitted through electronic power steering unit 206 to steering wheel 202.

Figure 13:
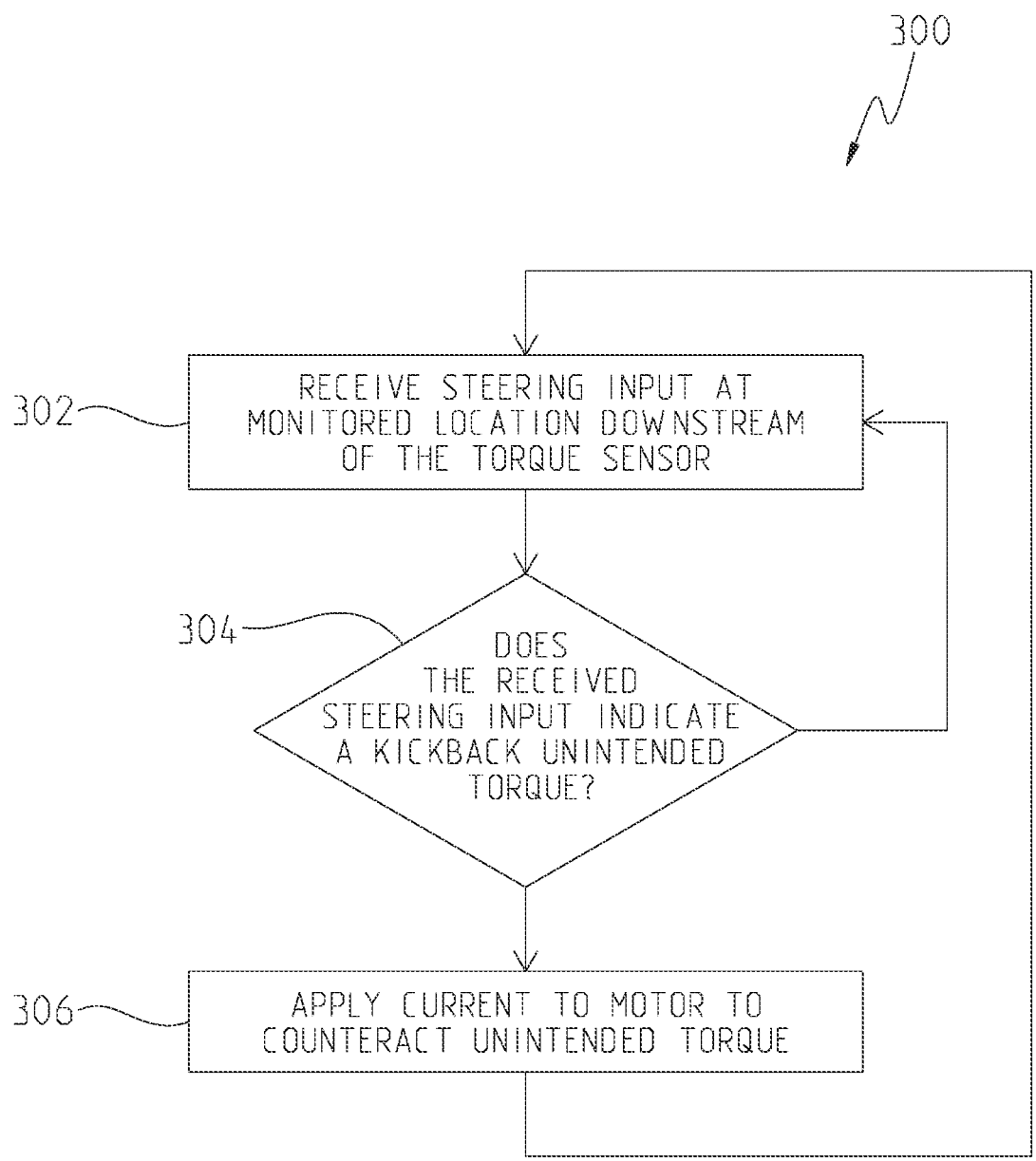
FIG. 13 is an exemplary processing sequence of the steering system of the vehicle of FIG. 1.

Referring to FIG. 13, an exemplary processing sequence 300 of kickback logic 263 is shown. Kickback logic 263 determines if a steering input at a monitored location downstream of the torque sensor is received, as represented by block 302. In embodiments, the steering input at a monitored location downstream of the torque sensor is received by monitoring one or more characteristics of steering assist motor 260. For example, a motor angular velocity sensor 310 monitors an angular speed of a movement of the rotor of steering assist motor 260. In embodiments, the steering input downstream of the torque sensor is received by monitoring at least one strain gauge supported by the tie rods 210. For example, a first strain gauge may monitor the tie rod extending to the front driver side ground engaging member and a second strain gauge may monitor the tie rod extending to the from passenger side ground engaging member.

Kickback logic 263 then determines if the received steering input downstream of the torque sensor corresponds to a kickback unintended torque, as represented by block 304. In embodiments, the received steering input is classified as either (1—normal operation) an intended torque or an unintended torque of similar scale as an intended torque and therefore will not be considered a kickback at the steering input 202 and (2—potential kickback) a kickback unintended torque. In embodiments, at least one characteristic of the received steering input is examined to classify the received steering input. For example, the at least one characteristic is a magnitude of a first characteristic of the received steering input and if the magnitude of the first characteristic of the received steering input is (a) less than a first threshold, then kickback logic 263 classifies the received steering input as "1—normal operation" and (b) equal to or greater than the first threshold, then kickback logic classifies the received steering input as "2—potential kickback". In one example, the first characteristic of the received steering input is an acceleration of steering assist motor 260.

Figure 14:
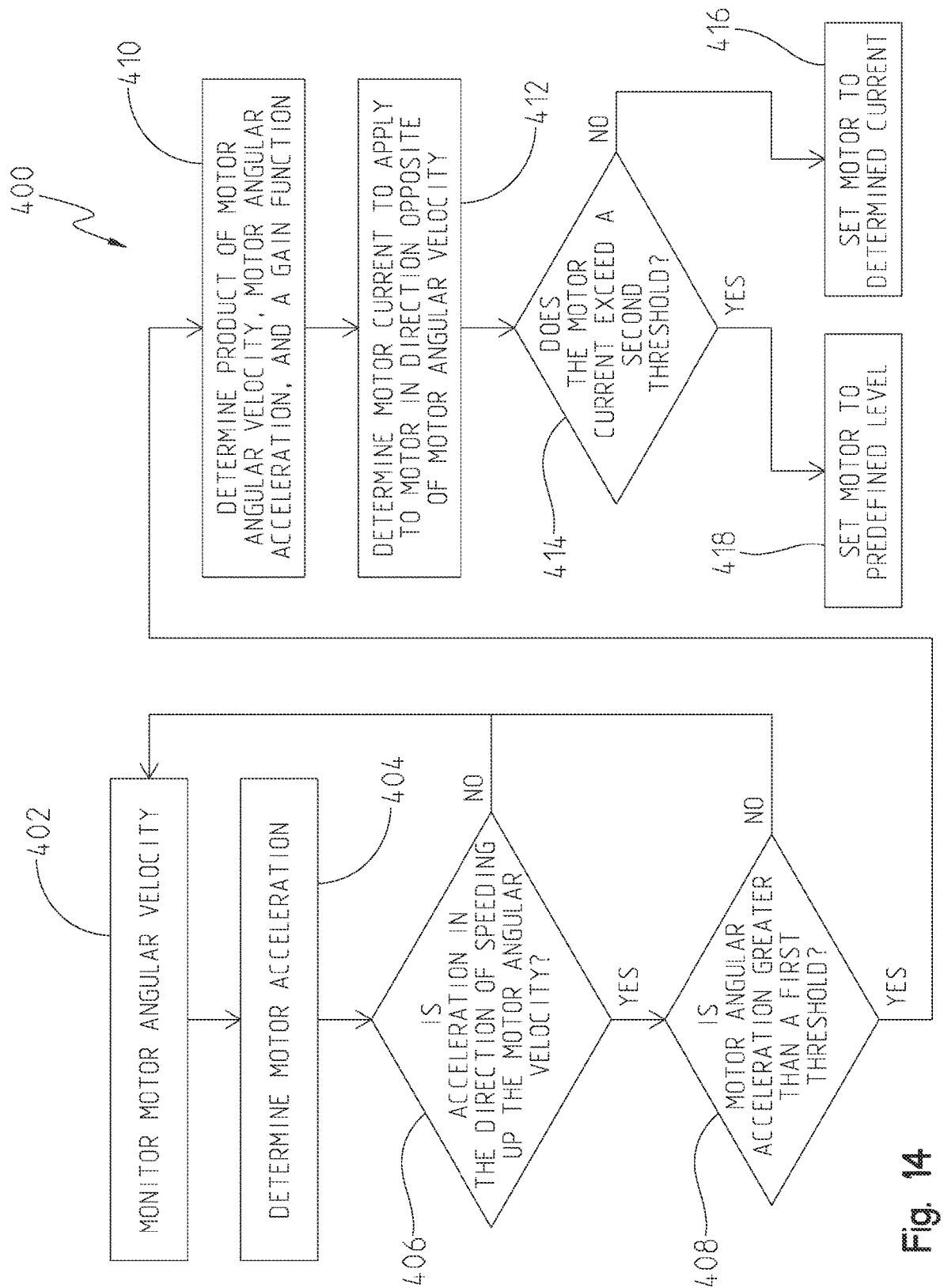
FIG. 14 is another exemplary processing sequence of the steering system of the vehicle of FIG. 1.

In embodiments, a plurality of characteristics of the received steering input are examined to classify the received steering input. Referring to FIG. 14, an exemplary processing sequence 400 of kickback logic 263 is illustrated. Kickback logic 400 monitors an angular velocity of steering assist motor 260, as represented by block 402. Kickback logic 400 determines a motor angular acceleration, as represented by block 404. The acceleration of the motor angular velocity, also referred to as the motor angular acceleration, is determined by sampling the motor angular velocity as spaced apart intervals and dividing the change in velocity over a given interval by the interval. Kickback logic 400 determines based on a first characteristic of steering input, the motor angular velocity, if the motor angular acceleration is speeding up the motor angular velocity, as represented by block 406. If the motor angular acceleration is in a direction resulting in speeding up of the motor angular velocity, kickback logic 400 compares a second characteristic, a magnitude of the motor angular acceleration, to a first threshold, as represented by block 408. In embodiments, the first threshold is set based on an expected acceleration that is achievable by an operator through operator steering input 202. In one example, the first threshold is about 6000 radians/sec/sec. In this manner, the first threshold distinguishes between steering inputs that are on the scale of an typical operator input through operator steering input 202 and steering inputs which exhibit a harsher, higher acceleration than typical operator inputs and thus would be jarring to the operator if reaching the operator steering input as kickback.

If the motor angular acceleration is less then the first threshold, then kickback logic 236 assumes that it may be the result of an operator input or at least is of the same magnitude, as represented by the return to block 402. If the motor acceleration is greater than the first threshold, then kickback logic 236 determines the product of the motor angular velocity, the motor angular acceleration, and a gain function, as represented by block 410. In one example, the gain function is a constant value. In another example, the gain function is a linear relationship as a function of the motor angular acceleration. In a further example, the gain function is a non-linear or a piece-wise relationship as a function of motor angular acceleration. In yet another example, the gain function increases as the motor angular acceleration increase. Further, in embodiments, the gain function increases as the motor angular velocity increases. Kickback logic 236 determines based on the determined product a motor current to apply to the steering assist motor in the direction opposite the motor angular acceleration to counteract the motor angular acceleration, as represented by block 412. In one example, the gain factor is set so that the determined product equates to the motor current to apply.

Kickback logic 236 then compares the determined motor current to apply to a second threshold, as represented by block 414. If the determined motor current to apply is less than the second threshold then the determined motor current to apply is applied, as represented by block 416. If the determined motor current to apply exceeds the second threshold then the motor current is set to a predefined level, as represented by block 418. In embodiments, the second threshold is a saturation limit of the motor current.

Figure 15:
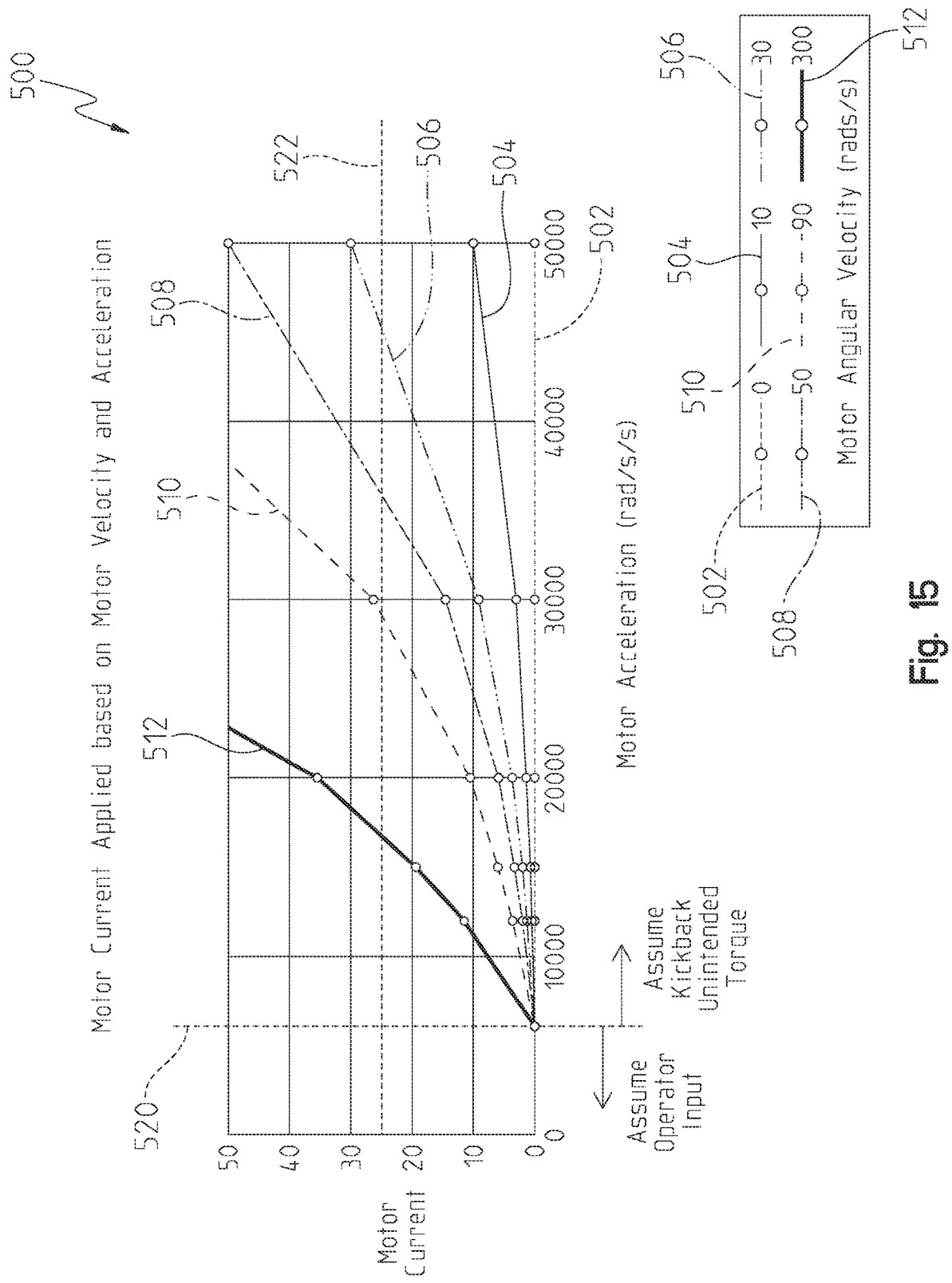
FIG. 15 is an exemplary map of the steering system of the vehicle of FIG. 1.

Referring to FIG. 15, an exemplary graph illustrating an implementation of steps 410 and 412 of processing sequence 400 is shown. As can be in FIG. 15, the first threshold 520 has been set to 6000 radians per second per second. At acceleration values less than 6000 no additional current is applied to the steering assist motor from kickback logic 236. At accelerations above 6000 a family of curves 500 are shown. Each curve 502, 504, 506, 508, 510, and 512 of the family of curves 500 represents the determined product of block 410 (which corresponds to the motor current to be applied in step 412) for a given motor angular velocity. For example, curve 510 is for a motor angular velocity of 90 radians per second. Although six curves are represented, additional curves for additional motor angular accelerations can be provided. As can be seen in FIG. 15, for higher motor angular velocities, the applied motor current ramps up faster than for lower motor angular velocities. Further, at higher motor angular accelerations a larger gain factor is applied for a given motor angular velocity resulting in each of the curves 502, 504, 506, 508, 510, and 512 being non-linear. In embodiments, the illustrated family of curves and additional curves are represented in a look-up table wherein based on a measured motor angular velocity and a determined motor angular acceleration, kickback logic 236 can look up a corresponding motor current to be applied. The second threshold of block 412 is represented by line 522. In one example, the second threshold is 25 Amps.

An advantage, among others, of applying a current to steering assist motor 260 to counter the unintended torque, is that steering assembly 200 reduces or prevents unintended jerking of steering wheel 202. Another advantage, among others, is by monitoring motor acceleration, an unintended torque is detected prior to a detection of the unintended torque by torque sensor 242 resulting in a quicker response time and higher likelihood of reducing or preventing unintended jerking of steering wheel 202. A further advantage, among others, is that by monitoring motor acceleration, corrective action may be taken before output shaft 266 of steering assist motor 260 starts to rotate too quickly to produce sufficient torque to counteract the unintended torque due to motor characteristics.

Figure 16:
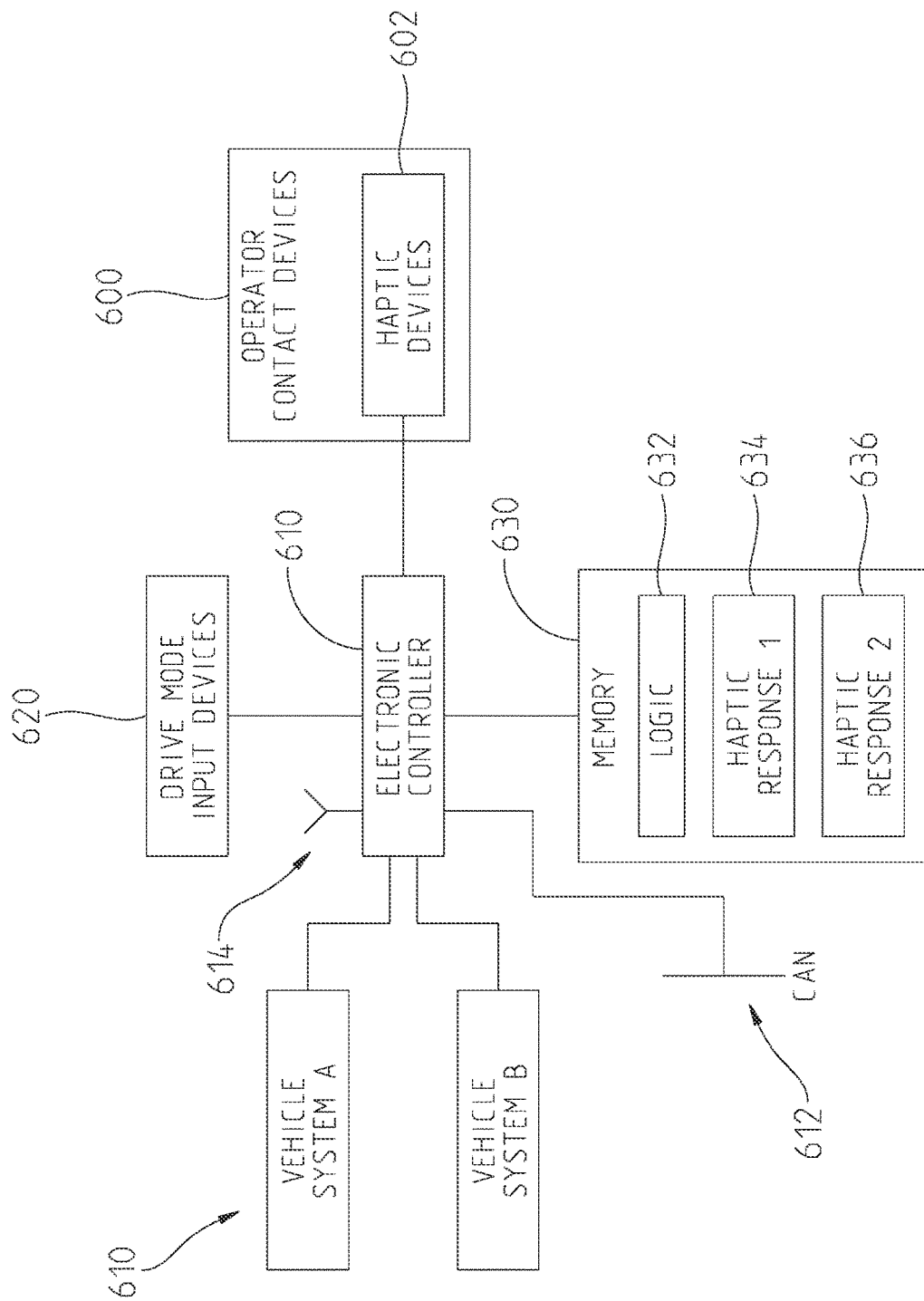
FIG. 16 is a representative view of a haptic response system of the vehicle of FIG. 1.

Referring to FIG. 16, in embodiments, one or more operator contact devices 600 include one or more haptic devices 602 each. Exemplary haptic devices 602 include piezoelectric transducers which when energized with an electrical signal can produce a vibration signal. For example, a piezoelectric transducer energized with a square wave signal have a period p1 will pulse vibrations at the same period p1. In embodiments, power steering unit 206 is used to generate the haptic signal as steering vibration. A vibration signal, such as a sine wave, is superimposed on the normal power steering operation and causes small vibrations of the steering wheel which may be perceived by an operator. Exemplary operator contact devices 600 includes portions of the vehicle 100 which when vehicle is moving are generally in contact with the operator of the vehicle including seat 124 and steering wheel 202. When a haptic device 602 which is part of a given operator contact device 600 vibrates, the operator may feel the vibration through the operator contact device 600.

The electrical signals are provided to the haptic devices 602 by electronic controller 610 of vehicle 100. Electronic controller 610 is operatively coupled to or otherwise includes a memory 630. In embodiments, electronic controller 610 is motor control circuit 250. In embodiments, electronic controller 610 is one or more controllers associated with side-by-side recreational vehicle 100.

In embodiments, electronic controller communicates with or otherwise monitors one or more vehicle systems 612, illustratively vehicle system A and vehicle system B. Electronic controller 610 may be directly coupled to a given vehicle system 610, communicate with a given vehicle system over a wired network, such as CAN network 612, and/or communicate with a given vehicle system or remote device over a wireless communication system including antenna 614. Exemplary wireless communication systems are disclosed in Exemplary vehicle communication systems and associated processing sequences are disclosed in U.S. patent application Ser. No. 16/234,162, filed Dec. 27, 2018, titled RECREATIONAL VEHICLE INTERACTIVE TELEMETRY, MAPPING AND TRIP PLANNING SYSTEM; U.S. patent application Ser. No. 15/262,113, filed Sep. 12, 2016, titled VEHICLE TO VEHICLE COMMUNICATIONS DEVICE AND METHODS FOR RECREATIONAL VEHICLES; U.S. Pat. No. 10,764,729, titled COMMUNICATION SYSTEM USING VEHICLE TO VEHICLE RADIO AS AN ALTERNATE COMMUNICATION MEANS, filed Dec. 12, 2018; U.S. Published Patent Application No. 2019/0200189, titled COMMUNICATION SYSTEM USING CELLULAR SYSTEM AS AN ALTERNATE TO A VEHICLE TO VEHICLE RADIO, filed Dec. 12, 2018; U.S. Published Patent Application No. 2019/0200173, titled METHOD AND SYSTEM FOR FORMING A DISTANCED-BASED GROUP IN A VEHICLE TO VEHICLE COMMUNICATION SYSTEM, filed Dec. 12, 2018; U.S. Published Patent Application No. 2019/0200188, titled VEHICLE-TO-VEHICLE COMMUNICATION SYSTEM, filed Dec. 12, 2018; U.S. patent application Ser. No. 16/811,865, filed Mar. 6, 2020, titled RECREATIONAL VEHICLE GROUP MANAGEMENT SYSTEM; U.S. Patent Application Ser. No. 63/016,684, filed Apr. 28, 2020, titled SYSTEM AND METHOD FOR DYNAMIC ROUTING; U.S. patent application Ser. No. 16/013,210, filed Jun. 20, 2018, titled VEHICLE HAVING SUSPENSION WITH CONTINUOUS DAMPING CONTROL; and U.S. patent application Ser. No. 15/816,368, filed Nov. 17, 2017, titled VEHICLE HAVING ADJUSTABLE SUSPENSION, the entire disclosures of which are expressly incorporated by reference herein.

Further, electronic controller 610 is operatively connected to drive mode input devices 620 through which an operator of vehicle 100 may select a drive mode for vehicle 100. Exemplary drive modes include a blackout mode wherein visible displays are disabled or have their outputs limited.

In embodiments, electronic controller 610 executes logic 632 which causes one or more of haptic devices 602 to vibrate in response to a characteristic of at least one of electronic controller 610. Exemplary characteristics include warnings, such as a check engine status. In embodiments, logic 632 initiates a "haptic response 1" 634 in response to a first characteristic of at least one of electronic controller 610 and a "haptic response 2" 636 in response to a second characteristic of at least one of electronic controller 610. In examples, "haptic response 2" 636 differs from "haptic response 1" 634 in one or more of frequency, amplitude, duration, or other suitable characteristics by which an operator can distinguish between "haptic response 2" 636 and "haptic response 1" 634.

In embodiments, logic 632 provides haptic responses based on the drive mode selected. For example, in a first drive mode no haptic responses are provided while in a second drive mode haptic responses are provided or the haptic responses provided in a first drive mode are different than the haptic responses provided in a second drive mode. Haptic responses may be provided in any of autonomous driving modes, semi-autonomous driving modes, and standard driving modes.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
   a plurality of ground engaging members;
   a frame supported by the plurality of ground engaging members;
   at least one seat;
   a powertrain operatively coupled to at least a portion of the plurality of ground engaging members to in use propel the vehicle; and
   a steering system operatively coupled to at least a first ground engaging member and a second ground engaging member of the plurality of ground engaging members to steer the vehicle, the steering system including an operator steering input device;
      a steering input shaft operatively coupled to the operator steering input device;
      a power steering assembly including a motor, a gearset operatively coupled to the motor, and a motor control circuit operatively coupled to the motor;
      a steering output shaft operatively coupled to the steering input shaft through the power steering assembly and to the gearset of the power steering assembly;
      a first tie rod operatively coupling the steering output shaft to the first ground engaging member;
      a second tie rod operatively coupling the steering output shaft to the second ground engaging member; and
      at least one sensor to provide an indication of an acceleration of the motor of the power steering assembly, the motor control circuit adjusting a characteristic of the motor to reduce a transmission to the operator steering input device of an unintended torque steering input from one of the first ground engaging member and the second ground engaging member;
      wherein the motor control circuit adjusts the characteristic of the motor to reduce the transmission to the operator steering input device of the unintended torque steering input from one of the first ground engaging member and the second ground engaging member when the acceleration of the motor of the power steering system is increasing an angular velocity of the motor.

2. The vehicle of claim 1, wherein the characteristic of the motor is a current of the motor.

3. The vehicle of claim 1, wherein the at least one sensor is a motor angular velocity sensor.

4. The vehicle of claim 3, wherein the motor angular velocity sensor monitors the angular velocity of an output shaft of the motor.

5. The vehicle of claim 1, wherein the motor control circuit adjusts the characteristic of the motor to reduce the transmission to the operator steering input device of the unintended torque steering input from one of the first ground engaging member and the second ground engaging member when both (1) the acceleration of the motor of the power steering system is increasing the angular velocity of the motor, and (2) the motor angular acceleration exceeds a first threshold.

6. A power steering system for a vehicle, the power steering system being coupled to a steering input shaft in use operatively coupled to an operator steering input device and a steering output shaft in use operatively coupled to at least one ground engaging member, the power steering system comprising:
 a motor,
 a gearset operatively coupled to the motor and in use operatively coupled to the steering output shaft;
 a motor control circuit operatively coupled to the motor; and
 at least one sensor in use to provide an indication of an acceleration of the motor, the motor control circuit adjusting a characteristic of the motor to reduce a transmission to the operator steering input device of an unintended torque input into the steering output shaft from the at least one ground engaging member;
 wherein the motor control circuit determines a motor angular acceleration of the motor of the power steering assembly based on the indication of the acceleration of the motor of the power steering assembly and adjusts the characteristic of the motor to reduce the transmission to the operator steering input device of the unintended torque input into the steering output shaft from the at least one ground engaging member when the acceleration of the motor is increasing an angular velocity of the motor.

7. The power steering system of claim 6, wherein the characteristic of the motor is a current of the motor.

8. The power steering system of claim 6, wherein the at least one sensor is a motor angular velocity sensor.

9. The power steering system of claim 8, wherein the motor angular velocity sensor monitors the angular velocity of an output shaft of the motor.

10. The power steering system of claim 6, wherein the motor control circuit determines a motor angular acceleration of the motor of the power steering assembly based on the indication of the acceleration of the motor of the power steering assembly and adjusts the characteristic of the motor to reduce the transmission to the operator steering input device of the unintended torque steering input from one of the first ground engaging member and the second ground engaging member when both (1) the acceleration of the motor is increasing the angular velocity of the motor, and (2) the motor angular acceleration exceeds a first threshold.

11. A method of reducing kickback at an operator steering input of a vehicle from a power steering assembly due to an unintended torque input into a steering output shaft coupled to the power steering assembly from one of a first ground engaging member of the vehicle and a second ground engaging member of the vehicle, the first ground engaging member of the vehicle and the second ground engaging member of the vehicle being operatively coupled to the steering output shaft, the method comprising the steps of:
 monitoring at least one characteristic of the steering assembly;
 classifying a received steering input as one of a normal operation and a potential kickback based on a character of the received steering input on the monitored at least one characteristic; and
 when the received steering input is classified as the potential kickback, adjusting a characteristic of a motor of the power steering system to counteract the received steering input;
 wherein the at least one characteristic includes an angular acceleration of the motor of the power steering assembly;
 wherein the step of classifying the received steering input as one of the normal operation and the potential kickback based on the character of the received steering input includes the steps of;
 comparing a magnitude of the angular acceleration of the motor of the power steering assembly to a first threshold; and
 classifying the received steering input as a potential kickback when the magnitude of the angular acceleration of the motor of the power steering assembly exceeds the first threshold.

12. The method of claim 11, wherein the at least one characteristic of the steering assembly is between a torque sensor of the power steering assembly monitoring a twist angle of a torque shaft of the power steering assembly and the first ground engaging member.

13. The method of claim 11, wherein the at least one characteristic of the steering assembly includes a first characteristic of a motor of the power steering assembly and a second characteristic of the power steering assembly.

14. The method of claim 13, wherein the first characteristic of the motor of the power steering assembly is an indication of an angular velocity of a motor shaft of the motor of the power steering assembly and the second characteristic is an indication of an angular acceleration of the motor shaft of the motor of the power steering assembly.

15. The method of claim 14, wherein the step of adjusting the characteristic of the motor of the power steering system to counteract the received steering input includes the step of applying a current to the motor to counteract the received steering input, a magnitude of the current being based on both the indication of the angular velocity of the motor shaft of the motor of the power steering assembly and the indication of the angular acceleration of the motor shaft of the motor of the power steering assembly.

16. A vehicle, comprising:
 a plurality of ground engaging members;
 a frame supported by the plurality of ground engaging members;
 at least one seat;
 a powertrain operatively coupled to at least a portion of the plurality of ground engaging members to in use propel the vehicle; and
 a steering system operatively coupled to at least a first ground engaging member and a second ground engaging member of the plurality of ground engaging members to steer the vehicle, the steering system including an operator steering input device;

a steering input shaft operatively coupled to the operator steering input device;

a power steering assembly including a motor, a gearset operatively coupled to the motor, and a motor control circuit operatively coupled to the motor;

a steering output shaft operatively coupled to the steering input shaft through the power steering assembly and to the gearset of the power steering assembly;

a torque sensor monitoring a torque between the steering input shaft and the steering output shaft;

a first tie rod operatively coupling the steering output shaft to the first ground engaging member;

a second tie rod operatively coupling the steering output shaft to the second ground engaging member; and at least one sensor to provide an indication of at least two characteristics of the steering system downstream of the torque sensor, the motor control circuit adjusting a characteristic of the motor to reduce a transmission to the operator steering input device of an unintended torque steering input from one of the first ground engaging member and the second ground engaging member, wherein a first characteristic of the at least two characteristics of the steering system downstream of the torque sensor is a strain of the first tie rod.

17. The vehicle of claim 16, wherein the first characteristic of the at least two characteristics of the steering system downstream of the torque sensor is one of the first strain of the first tie rod and a second strain of the second tie rod.

18. The vehicle of claim 16, wherein a second characteristic of the at least two characteristics of the steering system downstream of the torque sensor is an angular velocity of the motor of the power steering system.

19. The vehicle of claim 17, wherein a second characteristic of the at least two characteristics of the steering system downstream of the torque sensor is an angular acceleration of the motor of the power steering system.

20. The vehicle of claim 16, wherein a second characteristic of the at least two characteristics of the steering system downstream of the torque sensor is an angular acceleration of the motor of the power steering system.

21. A method of reducing kickback at an operator steering input of a vehicle from a power steering assembly due to an unintended torque input into a steering output shaft coupled to the power steering assembly from one of a first ground engaging member of the vehicle and a second ground engaging member of the vehicle, the first ground engaging member of the vehicle and the second ground engaging member of the vehicle being operatively coupled to the steering output shaft via a first tie rod and second tie rod respectively, the method comprising the steps of:

monitoring at least two characteristics of the steering assembly including (1) a torque exhibited between a steering input shaft operatively coupled to the operator steering input device and the steering output shaft and (2) a strain of the first tie rod;

determining, independent of the torque exhibited between the steering input shaft operatively coupled to the operator steering input device and the steering output shaft, if the unintended torque input into the steering output shaft coupled to the power steering assembly from one of the first ground engaging member of the vehicle and the second ground engaging member of the vehicle is a potential kickback; and counteracting, by operating a motor of the power steering assembly, the potential kickback to reduce a transmission to the operator steering input device of the unintended torque input into the steering output shaft from one of a first ground engaging member of the vehicle and a second ground engaging member of the vehicle.

22. A vehicle, comprising:

a plurality of ground engaging members;

a frame supported by the plurality of ground engaging members;

at least one seat;

a powertrain operatively coupled to at least a portion of the plurality of ground engaging members to in use propel the vehicle; and a steering system operatively coupled to at least a first ground engaging member and a second ground engaging member of the plurality of ground engaging members to steer the vehicle, the steering system including an operator steering input device;

a steering input shaft operatively coupled to the operator steering input device;

a power steering assembly including a motor, a gearset operatively coupled to the motor, and a motor control circuit operatively coupled to the motor;

a steering output shaft operatively coupled to the steering input shaft through the power steering assembly and to the gearset of the power steering assembly;

a first tie rod operatively coupling the steering output shaft to the first ground engaging member;

a second tie rod operatively coupling the steering output shaft to the second ground engaging member; and at least one sensor to provide an indication of an acceleration of the motor of the power steering assembly, the motor control circuit adjusting a characteristic of the motor to reduce a transmission to the operator steering input device of an unintended torque steering input from one of the first ground engaging member and the second ground engaging member;

wherein the motor control circuit adjusts the characteristic of the motor to reduce the transmission to the operator steering input device of the unintended torque steering input from one of the first ground engaging member and the second ground engaging member when the acceleration of the motor exceeds a first threshold.

23. A power steering system for a vehicle, the power steering system being coupled to a steering input shaft in use operatively coupled to an operator steering input device and a steering output shaft in use operatively coupled to at least one ground engaging member, the power steering system comprising:

a motor, a gearset operatively coupled to the motor and in use operatively coupled to the steering output shaft;

a motor control circuit operatively coupled to the motor; and at least one sensor in use to provide an indication of an acceleration of the motor, the motor control circuit adjusting a characteristic of the motor to reduce a transmission to the operator steering input device of an unintended torque input into the steering output shaft from the at least one ground engaging member;

wherein the motor control circuit determines a motor angular acceleration of the motor of the power steering assembly based on the indication of the acceleration of the motor of the power steering assembly and adjusts the characteristic of the motor to reduce the transmission to the operator steering input device of the unintended torque steering input from one of the first ground engaging member and the second ground engaging member when the motor angular acceleration exceeds a first threshold.

* * * * *